United States Patent [19]

Jaeger et al.

[11] Patent Number: 4,701,614
[45] Date of Patent: Oct. 20, 1987

[54] FIBER OPTIC PRESSURE SENSOR

[75] Inventors: Raymond E. Jaeger; Mohd Aslami, both of Sturbridge, Mass.

[73] Assignee: Spectran Corporation, Sturbridge, Mass.

[21] Appl. No.: 624,259

[22] Filed: Jun. 25, 1984

[51] Int. Cl.$^4$ .............................................. H01J 5/16
[52] U.S. Cl. ............................... 250/227; 250/231 P; 350/96.29
[58] Field of Search ............... 73/705; 250/227, 231 P; 350/96.29, 96.30, 96.33, 96.36

[56] References Cited

U.S. PATENT DOCUMENTS 4,342,907 8/1982 Macedo et al. ................... 250/227
4,530,078 7/1985 Lagakos et al. ............. 350/96.29 X

OTHER PUBLICATIONS

"Multimode Optical Fiber Displacement Sensor," *Applied Optics*, vol. 20, No. 2, Jan. 15, 1981, pp. 167–168 by Lagakos et al.

"Fiber Optics Turns to Sensing," *High Technology*, Jul.-Aug. 1982, pp. 49–56 by Jeff Hecht.

*Primary Examiner*—Eugene R. LaRoche
*Assistant Examiner*—James Lee
*Attorney, Agent, or Firm*—Pennie & Edmonds

[57] ABSTRACT

An arrangement for an optical fiber pressure sensor is described. This sensor is comprised of two coating layers concentrically clad to and coaxially oriented with an optical fiber. The first coating layer is comprised of a relatively hard optically lossy material which absorbs any light radiating outwardly from the optical fiber. The second coating layer is comprised of a compliant material in which granular particles have been uniformly dispersed. In response to any pressure laterally applied to the sensor, the compliant coating layer imparts micro-bends, onto the optical fiber, which, in turn, couple light from propagating modes to non-propagating modes. As a result, the amplitude (or power) of the light exiting the optical fiber advantageously decreases in response to this pressure.

12 Claims, 4 Drawing Figures

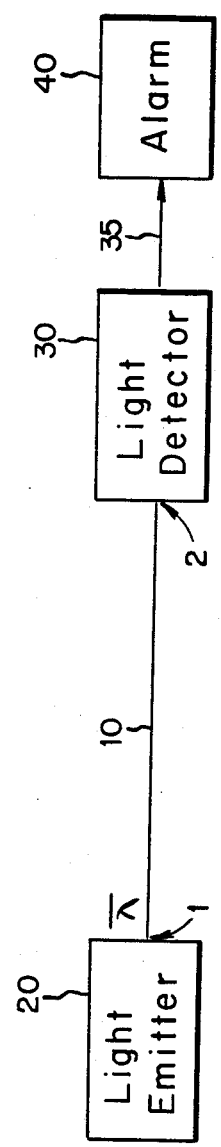

FIBER OPTIC PRESSURE SENSOR

BACKGROUND OF THE INVENTION

1. Field of the Invention

This invention relates to a pressure sensor which utilizes an optical fiber as its sensing element and is highly sensitive to laterally applied pressure.

2. Background of the Invention

It is well-known that a pressure sensor can be implemented by utilizing an optical fiber that is sensitive to very small bends, commonly referred to as "micro-bends," which are imparted to the fiber. Specifically, these micro-bends react, in response to any pressure laterally applied to all or a portion of the optical fiber, by coupling substantially all the light propagating through the optical fiber from any particular propagating (core) mode to a non-propagating (clad) mode. An acousto-optic sensor which relies on this concept is described in, for example, N. Lagakos et al., "Multimode Optical Fiber Displacement Sensor", *Applied Optics*, Vol. 20, No. 2, Jan. 15, 1981, pages 167–168, and specifically page 167; and Hecht et al., "Fiber Optics Turns To Sensing", *High Technology*, July–August 1982, pages 49–56, and specifically pages 51 and 53.

Such an optical fiber is typically comprised of a optically transmissive central core, an optical cladding layer concentrically surrounding the core and having a lower index of refraction than the core, and possibly an optically opaque coating layer concentrically surrounding the cladding layer and having a higher index of refraction than the cladding layer. Whenever a micro-bend is imparted to the fiber, a portion of the light which propagates through the central core in the vicinity of each micro-bend is directed into the cladding layer. Since the coating layer has a higher index than the cladding, the coupled light is directed out of the cladding layer and is eventually absorbed by the opaque coating. This, in turn, decreases the power of the light propagating through the entire length of the optical fiber. As a result, the magnitude of any laterally applied pressure can be readily detected simply by monitoring the amplitude (or power) of the light exiting the core of the optical fiber.

Unfortunately, presently existing fiber optic pressure sensors exhibit a disappointingly low sensitivity to a laterally applied pressure. This occurs because almost all optical fibers are designed for communications—the the predominant use of optical fibers—and the design characteristics of an optical fiber suitable for low-loss optical signal transmission (communication) are generally opposite to those characteristics suitable for a pressure sensor. These latter characteristics—all of which are intentionally avoided, minimized or limited through design of a communications type fiber—include: high micro-bend losses, a large core diameter relative to the thickness of the cladding layer, a low numerical aperture of the fiber, i.e. a relatively small difference in the index of refraction between the core and the cladding layer, and a hard opaque (non-deforming) coating.

Inasmuch as few, if any, oommercially available optical fibers designed for non-communication use exist, the art turned to solutions aimed at increasing the rather low sensitivity of communication-type fibers to a laterally applied pressure. These solutions by and large all include incorporating the fiber into an external device which physically deforms the fiber to induce a substantial number of micro-bends in response to a laterally applied pressure. For example, see the apparatus described in the above-cited Lagakos article and in U.S. Pat. No. 4,342,907 (issued to P. B. Macedo et al on Aug. 3, 1982). Unfortunately, the use of these external devices adds several drawbacks, notably increased bulk, cost and mechanical complexity, to an optical fiber based pressure sensor.

SUMMARY OF THE INVENTION

Accordingly, an object of the present invention is to provide an optical fiber pressure sensor that advantageously exhibits a high sensitivity to any pressure laterally applied to the sensor.

A particular object is to provide such a sensor which exhibits very high micro-bend losses in response to pressure laterally applied at any point along its length.

Another particular object is to provide such a sensor which does not require an external deformer to produce micro-bends.

These and other objects are achieved in accordance with this invention by a sensor having two coating layers concentrically clad around and coaxially oriented with an optically transmissive fiber, wherein the first coating layer is a hard optically lossy material and the second coating layer, clad over the first, is a compliant material containing a dispersion of granular particles. The optical fiber is comprised of a low-loss optically transmissive central core and at least one optical cladding layer.

In operation, the compliant coating layer, by virtue of the particles contained therein, distributes any pressure laterally applied to the sensor along a pre-selected length of the optical fiber in order to produce a substantial number of micro-bends in response to this pressure. These micro-bends advantageously couple a significant amount of light from a propagating (core) mode to a non-propagating (clad) mode. Once the light is coupled into the optical cladding layer, this layer directs the light into the lossy coating layer which, in turn, absorbs this light. As a result, the power (amplitude) of the light exiting the sensor markedly decreases. In view of the fact that a substantial number of micro-bends are produced in response to laterally applied pressure, the inventive optical fiber pressure sensor exhibits a high sensitivity.

BRIEF DESCRIPTION OF THE DRAWING

The invention may be clearly understood from a consideration of the following detailed description and accompanying drawing in which:

FIG. 4 is a block diagram of an intrusion detector utilizing the fiber optic pressure sensor shown in FIGS. 1–3.

To facilitate easy understanding, identical reference numerals are used to denote identical elements common to figures.

DETAILED DESCRIPTION

Figure 1:
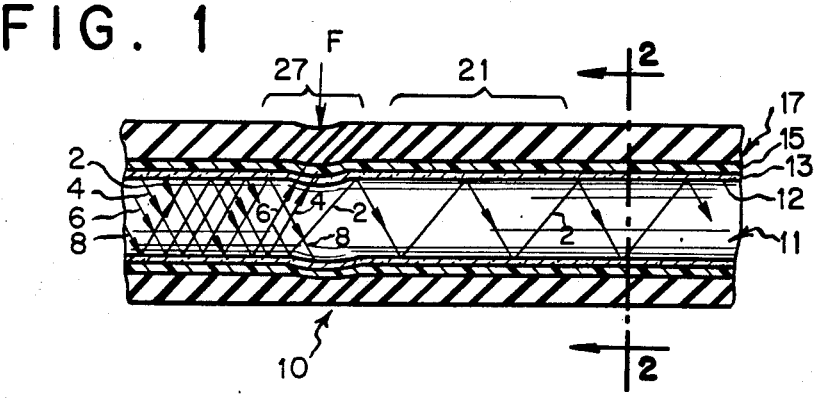
FIG. 1 is a longitudinal axial cross-sectional view of a portion of fiber optic pressure sensor 10 which embodies the principles of the present invention.
Figure 2:
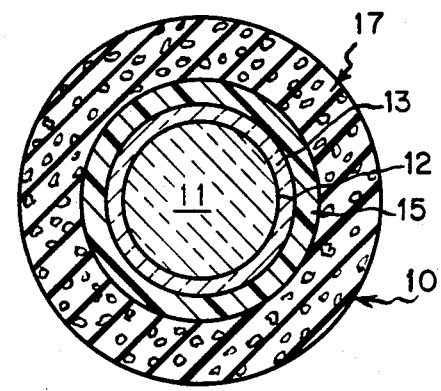
FIG. 2 is a enlarged cross-sectional view of the fiber optic pressure sensor taken along lines 2—2 shown in FIG. 1.

The longitudinal cross-sectional view shown in FIG. 1 and the axial cross-sectional view shown in FIG. 2, taken along lines 2—2 in FIG. 1, show a preferred embodiment of an optical fiber pressure sensor 10 which embodies the teachings of the present invention.

Specifically, optical fiber pressure sensor 10 includes an optical fiber having an optically transmissive central core 11, and an optical cladding layer 13 coaxially applied to and concentrically oriented with the central core. Both the core and cladding layer are preferably comprised of glass. The indices of refraction of core 11 and cladding layer 13 are appropriately chosen such that any light, which propagates through the core in the absence of any micro-bends and strikes boundary 12 situated between core 11 and cladding layer 13, is internally reflected back into the core. Hence, in the absence of any micro-bends imparted to the core, substantially all the light entering the core propagates through the entire length of the optical fiber and, ignoring normal cable attenuation losses, thereafter exits from it.

It is generally known that micro-bending loss increases as the optical fiber is forced to conform to increasing physical irregularity (surface roughness) imposed onto its outer surface. In addition, this loss is directly proportional to both the radius and the flexural rigidity of the fiber and is inversely proportional to the difference of the values of the respective indices of refraction of the core and cladding layer comprising the optical fiber. See, for example, generalized equations 28 and 29 appearing on page 252 of D. Gloge, "Optical-Fiber Packaging and Its Influence on Fiber Straightness and Loss," *The Bell System Technical Journal*, Vol. 54, no. 2, February 1975, pages 245-262. The validity of these equations has been experimentally confirmed by W. B. Gardner in "Microbending Loss in Optical Fibers," *The Bell System Technical Journal*, Vol. 54, No. 2, February 1975, pages 457-465.

Applicants have recognized that an effective and very sensitive optical fiber pressure sensor can be fabricated through use of a fiber designed to accentuate, rather than minimize, micro-bending loss wherein surface irregularities are imposed not through an external deformer but rather through a separate coating layer, containing a dispersion of particulate material, concentrically clad to and coaxially oriented with the optical fiber.

To produce such a sensor, two additional coating layers, as shown in FIGS. 1 and 2, are concentrically clad to and coaxially oriented with the optical fiber. The first coating layer, i.e. layer 15, is constructed of a hard, optically lossy material, preferably having a higher index of refraction than the optical cladding layer, and is clad to cladding layer 13 by conventional well-known techniques. A second coating layer, i.e. layer 17, is concentrically clad to layer 15 by conventional well-known techniques. In response to a laterally applied pressure, coating layer 17 imposes both significant surface irregularities onto the outer surface of coating layer 15 and, in turn, a substantial number of micro-bends onto the optical fiber. Coating layer 17 is constructed of a very compliant material in which a large number of fine hard granular particles have been uniformly distributed. These particles can illustratively be comprised of fine sand, grit or any similar hard particulate matter.

With this inventive structure in mind, micro-bend losses are accentuated by selecting an optical fiber with a relatively small outer diameter but with central core 11 being much thicker than cladding layer 13, using an optically lossy material for coating layer 15 that has a high flexural rigidity (a high Young's modulus value), using appropriate optical materials for central core 11 and cladding layer 13 such that the difference between the values of the respective indices of refraction is quite low (resulting in a low numerical aperture for the fiber), and choosing a highly compliant material for coating layer 17. Preferably coating layer 15 is fabricated from a polyacrylate or polyimid having a high elastic modulus or any similar material, and coating layer 17 is fabricated from illustratively rubber (such as RTV type silicone rubber manufactured by General Electric) or a polyacrylate having a low elastic modulus or any similar material.

Figure 3:
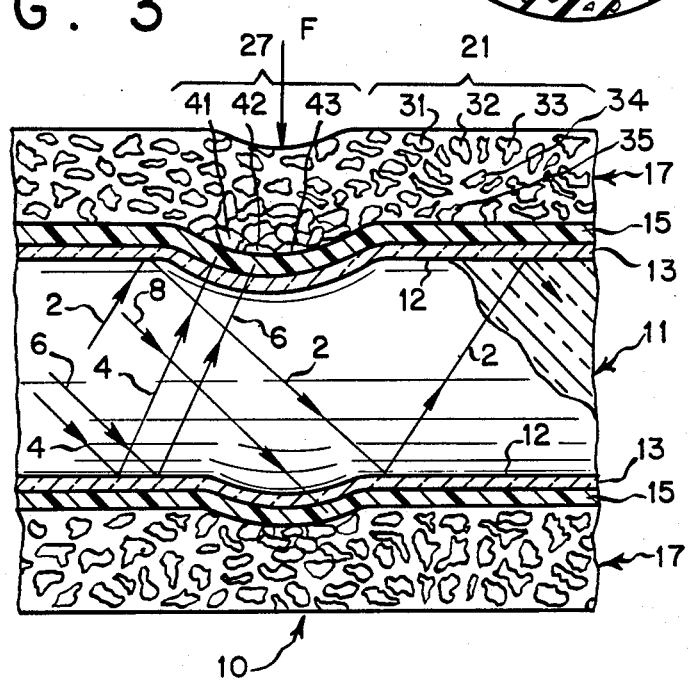
FIG. 3 is a substantially enlarged longitudinal cross-sectional view of that portion of the optical fiber sensor shown in FIG. 1, situated in the vicinity of a micro-bend.

To illustrate the operation of the inventive fiber optic pressure sensor, two illustrative examples will now be discussed in conjunction with FIG. 3: no laterally applied pressure, and a laterally applied pressure resulting from the application of force F to sensor 10. First, if no pressure is laterally applied to the sensor, such as for example along section 21, the particulate matter, comprising particles 31, 32, 33, and 34 among others, dispersed throughout this section of compliant coating layer 17 remain uniformly dispersed and are generally not compressed against each other. As a result, none of the particles residing in this section imposes a force against any other particles and also no particle residing in this section, such as particle 35, imposes a force against the outer surface of hard lossy coating layer 15. Thus, no surface irregularities are imposed along section 21 of the optical fiber and hence no micro-bends are imparted onto the optical fiber along this section. As a result, any ray of light, such as ray 2, which, in section 21, strikes boundary 12 between central core 11 and cladding layer 13 is merely reflected back into the central core and thus propagates through this section of the optical fiber. If no micro-bends occur throughout the remainder of the optical fiber, ray 2 propagates through the remainder of the optical fiber and thereafter exits the end of optical fiber pressure sensor 10.

Alternatively, if a localized force F is laterally imposed onto the surface of section 27 of compliant coating layer 17, then this force will initially deform (compress) this layer and move the particles residing in this section of the compliant coating layer close together. The response of the compliant coating layer to an initial deformation is directly determined by the stress/strain relationship of the compliant material. As the magnitude of this force continues to increase, the particles continue to move sufficiently close until the intervening compliant material is compressed to its limit. At this point, the response of the material to any increasing deformation is mainly determined by the stress/strain relationship of the particulate matter itself. As the force and deformation increase, various particles, such as particles 41, 42 and 43, are forced against the outer surface of hard lossy layer 15 and, in turn, impart a micro-bend to the optical fiber along section 27. As a result of this micro-bend, any light rays, such as rays 4, 6 and 8, which strike boundary 12 along this micro-bend, between central core 11 and cladding layer 13, are refracted into the cladding layer. From there, these rays travel through the cladding layer and strike lossy coating layer 15 which, in turn, absorbs these rays. Consequently, these rays do not propagate any further along the optical fiber and thus cause the amplitude (and power) of the light exiting the optical fiber to decrease. As the laterally applied pressure increases, and/or is applied across a larger section of the sensor, a greater number of micro-bends are imparted to the optical fiber which, in turn, further decreases the amplitude (and power) of the light exiting the sensor.

Advantageously, the minimum amount of laterally applied pressure, required to produce a micro-bend and cause a decrease in amplitude of the exiting light, can be set during manufacture of the sensor by appropriately selecting the number and size of particles to be uniformly dispersed throughout compliant coating layer 17. Clearly, as the particle count is increased, this minimum pressure decreases.

As shown in FIG. 4, the amplitude (or power) of the light, initially generated and injected into one end of the optical fiber by light emitter 20 and which thereafter exits the sensor, is detected at the output end of the fiber by well-known detection circuitry (not shown), such as semiconductor photodetectors and associated amplifiers all contained within light detector 30. The circuitry comprisi itter 20 is conventional in nature and the wavelength $\lambda$ of the emitted light is determined for the most part by the optical transmission characteristics of the optical fiber. This light is not limited to the visible spectrum, but can in fact extend into the non-visible spectrum (such as infra-red) if desired. The actual circuitry used in light detector 30 is also dependent upon the specific application in which the optical fiber pressure sensor is to be used. For example, if the sensor is illustratively used as shown in FIG. 4, as an intrusion sensor, then the detector should respond to sudden rapid changes (such as a rapid decrease) in the amplitude (or power) of any detected light and, in response thereto, apply an appropriate signal, via lead 35, to trigger an alarm, such as alarm 40.

Of course, it will be appreciated by those skilled in the art that the sensitivity of the inventive fiber optic pressure sensor to any laterally applied pressure can be changed by varying the size of the particles and their dispersion throughout the compliant coating layer. Specifically, if the same number of particles per unit volume is uniformly dispersed throughout the compliant coating layer, sensitivity can be increased if a larger particle size is used. Likewise, sensitivity can be decreased if smaller sized particles are used. Alternatively, for a given particle size, sensitivity can be increased or decreased if the density of the dispersed particles is increased or decreased, respectively. Clearly, any combination of these effects can be used to set the sensitivity to a desired value. Furthermore, localized regions of high or low sensitivity can be made by increasing or decreasing, respectively, the particle size and/or density of dispersed particles in each of these regions.

Although a specific illustrative embodiment has been shown and described herein, this merely illustrates the principles of the present invention. Many varied arrangements embodying these principles may be devised by those skilled in the art without departing from the spirit and scope of the invention.

What is claimed is:

1. An optical fiber pressure sensor comprising:
   an optically transmissive fiber,
   a layer of optically lossy material concentrically clad to the optical fiber and coaxially oriented therewith, and
   a compliant layer, having a dispersion of granular particles therein, concentrically clad to the lossy layer and coaxially oriented with the optical fiber.

2. The sensor in claim 1 wherein the optically lossy layer is comprised of a material that is substantially harder than the material comprising the compliant layer.

3. The sensor in claim 2 wherein the particles are substantially comprised of particulate matter.

4. The sensor in claim 1 wherein the granular particles are uniformly dispersed throughout the compliant layer.

5. The sensor in claim 4 wherein the particulate matter is comprised of sand or grit.

6. The sensor in claim 3 wherein the optical fiber is comprised of an optically transmissive core and at least one cladding layer, concentrically surrounding said core and coaxially oriented therewith, wherein said cladding layer has an index of refraction different from that of said core.

7. An arrangement for a pressure detector comprising:
   (a) an optical fiber pressure sensor having
      (1) an optically transmissive fiber,
      (2) a layer of optically lossy material concentrically clad to the optical fiber and coaxially oriented therewith, and
      (3) a compliant layer having a dispersion of granular particles therein, concentrically clad to the lossy layer, and coaxially oriented with the optical fiber,
   (b) means for producing light and injecting the light into one end of the optical fiber, and
   (c) means for detecting any light exiting from the other end of the optical fiber, and, in response to a pre-determined change in the exiting light, producing an indication that pressure has been applied to the optical fiber pressure sensor.

8. The arrangement in claim 7 wherein the lossy layer is comprised of a material that is substantially harder than the material comprising the compliant layer.

9. The apparatus in claim 8 wherein the particles are substantially comprised of particulate matter.

10. The arrangement in claim 7 wherein the granular particles are uniformly dispersed throughout the compliant layer.

11. The apparatus in claim 10 wherein the particulate matter is comprised of sand or grit.

12. The arrangement in claim 9 wherein the optical fiber is comprised of an optically transmissive core and at least one cladding layer concentrically surrounding the core and coaxially oriented therewith, wherein said cladding layer has an index of refraction different from that of said core.

* * * * *